United States Patent
Ciulla et al.

(10) Patent No.: US 9,226,441 B2
(45) Date of Patent: Jan. 5, 2016

(54) HUB-BEARING ASSEMBLY

(71) Applicants: Luca Ciulla, Turin (IT); Carlo Maldera, Giaveno (IT); Ferdinando Patalacci, Rosta (IT)

(72) Inventors: Luca Ciulla, Turin (IT); Carlo Maldera, Giaveno (IT); Ferdinando Patalacci, Rosta (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/561,917

(22) Filed: Dec. 5, 2014

(65) Prior Publication Data

US 2015/0156954 A1 Jun. 11, 2015

(30) Foreign Application Priority Data

Dec. 5, 2013 (IT) .............. TO2013A1001

(51) Int. Cl.
| | |
|---|---|
| *F16C 13/00* | (2006.01) |
| *F16C 33/76* | (2006.01) |
| *F16C 43/04* | (2006.01) |
| *A01B 71/04* | (2006.01) |

(Continued)

(52) U.S. Cl.
CPC ............ *A01B 71/04* (2013.01); *B60B 27/0005* (2013.01); *B60B 27/0078* (2013.01); *B60B 27/02* (2013.01); *F16C 19/184* (2013.01); *F16C 33/586* (2013.01); *F16C 35/067* (2013.01); *B60B 27/0073* (2013.01); *B60B 2310/204* (2013.01); *B60B 2310/211* (2013.01); *B60B 2310/321* (2013.01); *B60B 2360/1452* (2013.01); *B60B 2360/368* (2013.01); *B60B 2380/12* (2013.01); *B60B 2380/73* (2013.01); *B60B 2380/90* (2013.01); *B60B 2900/112* (2013.01); *B60B 2900/5112* (2013.01); *F16C 33/723* (2013.01); *F16C 33/7886* (2013.01); *F16C 35/042* (2013.01); *F16C 35/045* (2013.01); *F16C 2220/06* (2013.01); *F16C 2226/30* (2013.01); *F16C 2310/00* (2013.01)

(58) Field of Classification Search
CPC ..... F16C 33/723; F16C 35/045; F16C 35/077
USPC ................. 384/489, 537, 538, 544, 584, 589
See application file for complete search history.

(56) References Cited

U.S. PATENT DOCUMENTS

| | | | |
|---|---|---|---|
| 3,083,972 A | | 4/1963 | Huddle |
| 5,556,210 A | * | 9/1996 | Fukumura ..................... 384/517 |

(Continued)

FOREIGN PATENT DOCUMENTS

| | | |
|---|---|---|
| DE | 3316841 A1 | 11/1984 |
| DE | 19713333 A1 | 10/1998 |

(Continued)

*Primary Examiner* — Phillip A Johnson
(74) *Attorney, Agent, or Firm* — Bryan Peckjian; SKF USA Inc. Patent Dept.

(57) ABSTRACT

A hub-bearing assembly for agricultural use having a rolling bearing, a housing, a closing cap and an axial retention feature. The roller bearing includes an outer ring, at least one inner ring, at least a row of rolling bodies and a sealing device. The housing includes an almost annular cylindrical shape, the housing at one end forming a radial flange, containing the rolling bearing and being in direct contact with the bearing outer ring. The closing cap is assembled on the housing at the opposite end with respect to the end, where the housing forms the flange. It is noted that the cap is cup shaped. The axial retention feature is located along an external surface of the outer ring. The retention feature is located opposed to the axial sliding of the outer ring with respect to the housing.

4 Claims, 4 Drawing Sheets

(51) Int. Cl.
*B60B 27/00* (2006.01)
*B60B 27/02* (2006.01)
*F16C 35/067* (2006.01)
*F16C 19/18* (2006.01)
*F16C 33/58* (2006.01)
*F16C 35/04* (2006.01)
*F16C 33/72* (2006.01)
*F16C 33/78* (2006.01)

(56) References Cited

U.S. PATENT DOCUMENTS

| | | | |
|---|---|---|---|
| 5,802,995 | A | 9/1998 | Baugher et al. |
| 6,007,253 | A * | 12/1999 | Rutter .......................... 384/539 |
| 6,106,156 | A | 8/2000 | Niebling et al. |
| 2005/0105840 | A1 | 5/2005 | Muranaka et al. |
| 2005/0191002 | A1 * | 9/2005 | Ilie et al. ........................ 384/537 |
| 2007/0074879 | A1 | 4/2007 | Frasier |
| 2011/0232337 | A1 | 9/2011 | Mola et al. |
| 2011/0284812 | A1 | 11/2011 | Lindfors |
| 2012/0142470 | A1 * | 6/2012 | Varnnoux et al. ............. 474/199 |

FOREIGN PATENT DOCUMENTS

| | | |
|---|---|---|
| DE | 19860345 A1 | 7/2000 |
| DE | 10347361 A1 | 5/2005 |
| DE | 10355363 A1 | 6/2005 |
| DE | 102008007168 A1 | 8/2009 |
| DE | 202011104918 U1 | 11/2012 |
| DE | 102011078713 A1 | 1/2013 |
| EP | 1477329 A1 | 11/2004 |
| EP | 2661947 A2 | 11/2013 |
| GB | 1520341 A | 8/1978 |
| JP | H10100604 A | 4/1998 |

* cited by examiner

HUB-BEARING ASSEMBLY

CROSS REFERENCE TO RELATED APPLICATION

This is a National Stage application claiming the benefit of Italian Patent Application Number TO2013A001001 filed on 5 Dec. 2013 (5 Dec. 2013), which is incorporated herein by reference in its entirety.

TECHNICAL FIELD

The present invention is related to a hub-bearing assembly for agricultural, industrial, "off-highway" use and similar applications. In particular the hub-bearing assembly is applied to an agricultural disc for fertilizer spreading on a cultivated land.

BACKGROUND ART

In agriculture, devices are known in the shape of either smooth or toothed disc. By rotating due to land contact, such discs are able to dig groove on the land, to execute operations like ploughing, seeding, fertilizer spreading and other similar operations.

Usually, such discs are assembled side by side to correspondent shafts, which embossed protrude from the frame of an agricultural machine. Each disc is rotatable assembled, by means of a hub-bearing assembly, which comprises one or two radially inner rings, stationary, the inner rings steadily fixed to a central shaft, which embossed protrudes from an arm of the frame of an agricultural machine. The hub-bearing assembly also comprises a radially outer ring and a double row of balls, which is interposed between the outer ring and the inner rings. The inner rings, and consequently the bearing, are axially locked against the shoulder of the shaft, due to the tightening of a sleeve or a nut, which is screwed at a free end of the shaft. The outer ring can be contained in a housing, which is in one piece with an external radial flange, for assembling the disc. The housing is covered by a closing cap, which can be press-fit into the housing or screwed on it.

The housing, surrounding the outer ring, is normally made of plastic material and can be co-molded on the outer ring, according to a known technology. After co-molding, the cooling of the plastic material causes a dimensional reduction of the housing and, consequently, a radial interference between the radially inner surface of the housing and the radially external surface of the bearing outer ring.

Such hub-bearing assemblies are well known and have been disclosed in several documents, for example U.S. Pat. No. 3,083,972 A and US 2007/074879 A1.

Unfortunately, the radial interference between housing and outer ring is not enough, to let the assembly be suitable for all prescribed applications. At the same time, solutions aimed to improve the grip between metal and plastic (for example, creating a plurality of grooves all along the ring external surface, inside which the liquid plastic of the housing to be co-molded can flow) are part of non-conventional hub-bearing assemblies, which are more expensive.

Example of retention means to improve the grip between housing and ring are shown in GB 1520341 A, U.S. Pat. No. 6,106,156 A, DE 10347361 A, DE 19713333 A1, DE 19860345 A1, US 2005/105840 A1.

SUMMARY OF THE INVENTION

Aim of the present invention is to realize a hub-bearing assembly for agricultural use, which overcomes the above mentioned inconveniences.

According to the present invention, a hub-bearing assembly is described, the hub-bearing assembly having:
- a rolling bearing including an outer ring, at least one inner ring, at least one row of rolling bodies and a sealing device;
- a housing having an almost annular cylindrical shape, the housing at one end forming a radial flange, containing the rolling bearing and being in direct contact with the bearing outer ring;
- a closing cap, assembled on the housing at the opposite end with respect to the one end, where the housing forms the flange, the cap being cup shaped; and
- an axial retention feature, which are located along an external surface of the outer ring, said retention means being opposed to the axial sliding of the outer ring with respect to the housing, wherein said axial retention feature comprises a retention ring, which is assembled with radial interference on the bearing outer ring, the retention ring presenting a section, substantially "L" shaped, having a substantially radially extended wing, which provides the ring with mechanical resistance,
- wherein the housing is made of plastic material and is co-molded on the outer ring of the rolling bearing,
- wherein the substantially radially extended wing separates the outer ring from the sealing device.

In another aspect of the invention, preferred and/or particularly advantageous, the axial retention feature further comprising at least one housing portion, wherein the housing portion is shaped as a tooth and extends along a radially internal direction, and at least a corresponding outer ring portion, which is emptied along the same radially internal direction and makes available a volume, which is filled by said tooth portion.

In yet another aspect of the invention, preferred and/or particularly advantageous, the retention ring further comprising a substantially axially extended wing and a plurality of vanes.

Another aspect of the invention, preferred and/or particularly advantageous, the retention ring further comprising an axially extended appendix, which is bent along an external radial direction.

BRIEF DESCRIPTION OF THE DRAWINGS

The invention will be now described by reference to the enclosed drawings, which show some non-limitative embodiments, namely.

DETAILED DESCRIPTION

Figure 1:
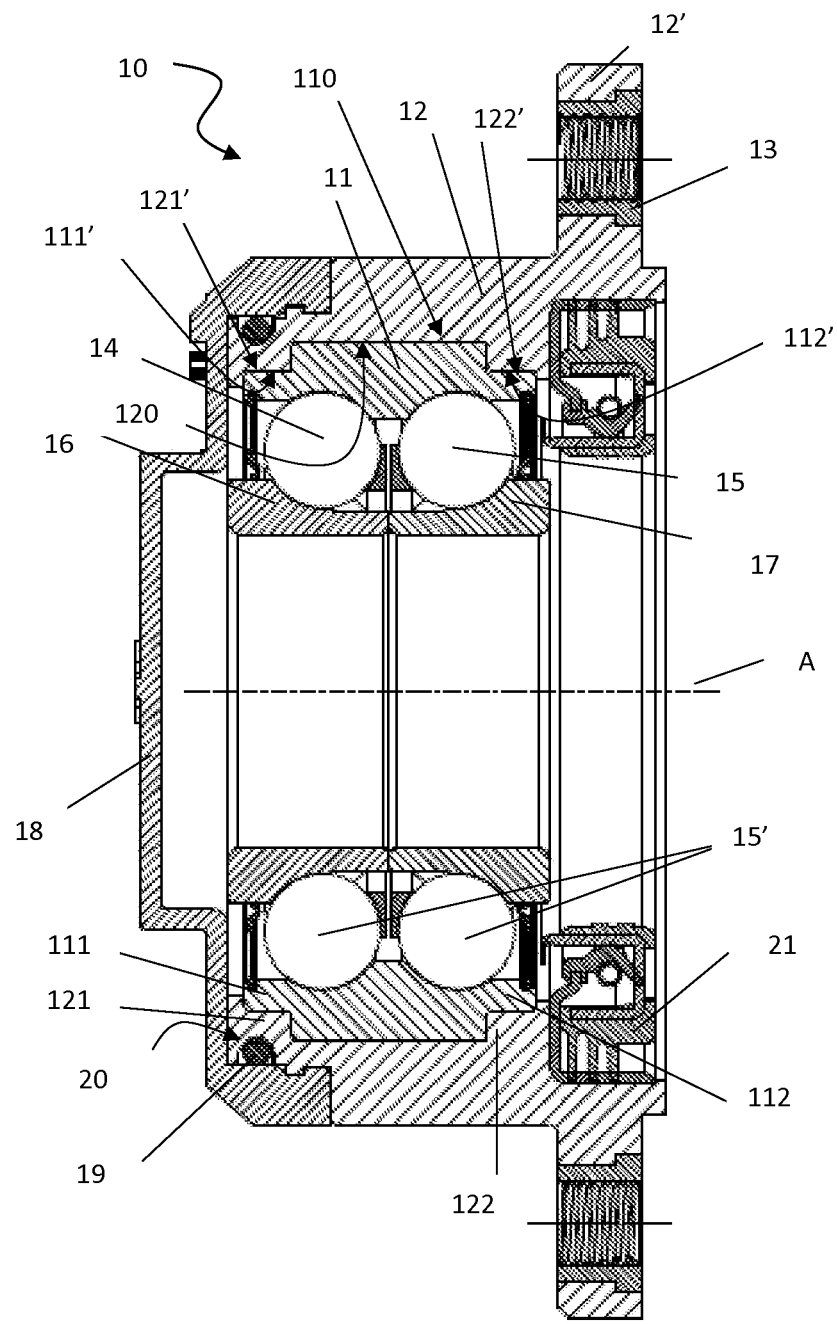
FIG. 1 is a section of the hub-bearing assembly, according to a first embodiment of the present invention.

With reference to FIG. 1, an embodiment of the invention is related to a hub-bearing assembly 10 for an agricultural disc, known and consequently not shown. The hub-bearing assembly comprises a rotatable radially outer ring 11, to whom, in a radially external position, a housing 12 is assembled, the housing being made of plastic material and co-molded on the radially outer ring 11. At one end, the housing forms a radial flange 12' for assembling the disc by means of bolts (not shown), which are screwed in a plurality of threaded metal inserts 13. A double row 14, 15 of rolling bodies 15' (for example, balls) is interposed between the outer ring 11 and a pair of radially inner rings 16, 17, which are tightly and side by side assembled on a central shaft A, which embossed protrudes from an arm (also not shown) of the frame of the agricultural machine. The inner rings 16, 17 are axially tighten against a shoulder of the shaft A, by means of a nut, which is screwed at the free end of the shaft A. Such an assembly is known and for this reason is not shown in the drawings. At the opposite end, with respect to the end where the housing forms a flange 12', a closing cap 18 is assembled on the housing 12 and between the housing and the cap a sealing ring 19 is accommodated in a radial and circular groove 20 of the housing 12 and is compressed between the housing 12 and the cap 18, to ensure sealing against contaminants, entering the inner parts of the bearing.

A case sealing device 21 is located at the side of the hub bearing assembly 10, where the agricultural disc is assembled. The sealing device 21 is made of a rotatable portion and a stationary portion.

The invention, according to different embodiments, hereafter described, concerns the use of axial retention means, aimed to improve the grip in the axial direction between the housing 12 and the outer ring, said grip being improved other than what is obtained by means of the radial interference between the plastic housing and the outer ring, in particular between the outer ring surface 110 and the housing surface 120. According to this first embodiment, axial retention means consist in the fact that the outer ring 11 presents two end portions 111, 112, whose correspondent external surfaces 111', 112' are located along a radially inner direction with respect to the surface 110. In other words, the outer ring ends are empty in the radial direction towards the shaft A.

During co-molding, in the available volume, part of the housing 12 plastic material will flow and realize two end portions 121, 122, whose respective internal surfaces 121', 122' will correspond and exactly fit with the outer ring surfaces 111' e 112'. In other words, the housing portion 121, 122 will be tooth shaped and will occupy the volume, which is made available by the empty portions 111, 112 of the outer ring. In this way, the engagement of the portions 121, 122 with the emptied outer ring will improve the axial sliding resistance of the housing with respect to the outer ring and vice versa.

Figure 2:
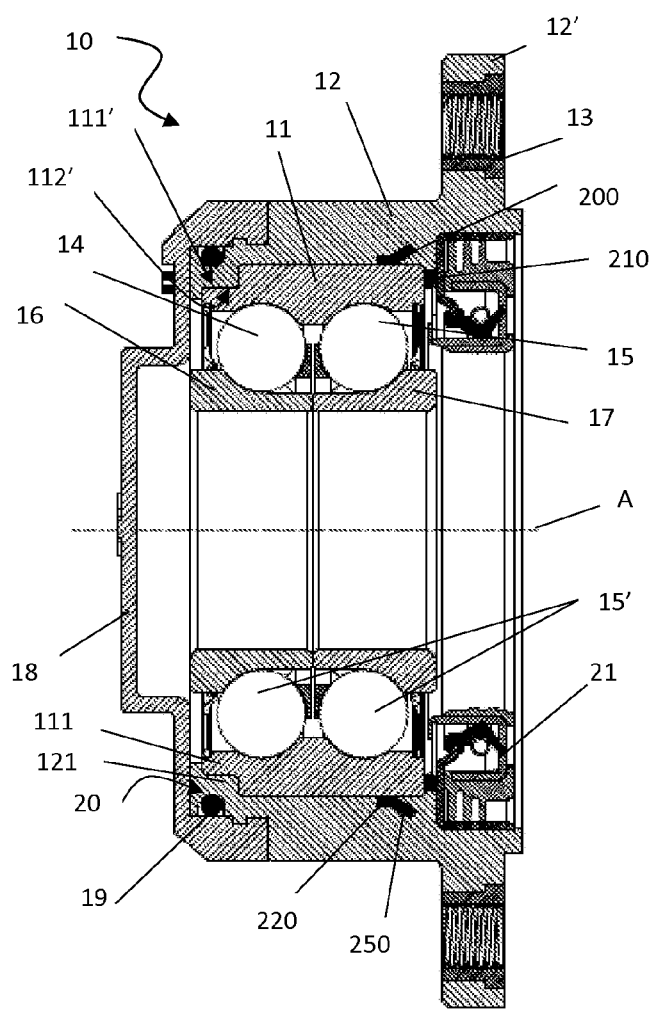
FIG. 2 is a section of the hub-bearing assembly, according to a second embodiment of the present invention.
Figure 3:
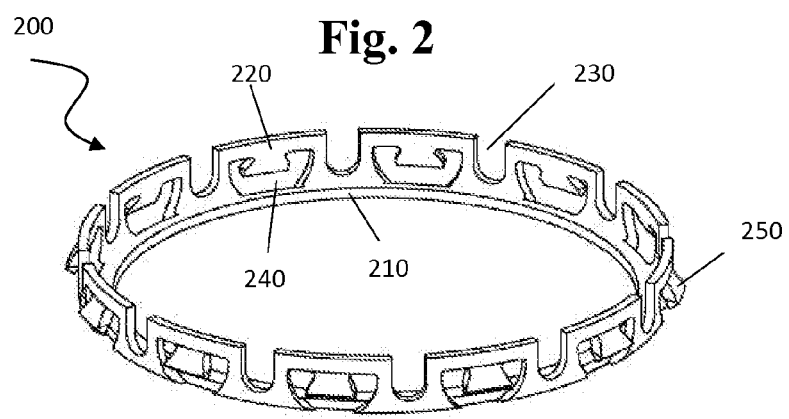
FIG. 3 is a detail in an axonometric view of a retention ring, used in the embodiment of FIG. 2.

With reference to FIG. 2, an alternative embodiment of the invention concerns the use of only one axial retention means, as the one, which has been described in the previous solution (FIG. 1), and a further retention means, which will be hereafter described. For example, beside the closing cap 18, the axial retention means will be as the one already described: a portion 111 of the outer ring 11 is emptied with respect to the radial dimension of said outer ring and, at the same time, a housing 12 tooth shaped portion 121, which is obtained during co-molding, fills the empty volume, as already described. Instead, on the flange 12' side, the further retention means is a retention ring 200 which is mounted on the bearing outer ring 11 with radial interference. This retention ring also increases the axial sliding resistance of the bearing with respect to the external co-molded housing. In fact, shape and dimensions of the ring have been optimized to maximize its retention performance. In FIG. 3 a possible embodiment of the retention ring 200 is shown. The ring presents an axisymmetric geometry and a substantially "L" shaped section. Said "L" shaped section has a substantially radially extended wing 210, which provides the ring with mechanical resistance, since the ring is assembled by radial interference on the bearing outer ring, and a substantially axially extended wing 220. Along the axial direction the ring section is not solid but comprises a first plurality of vanes 230, "U" shaped, and a second plurality of vanes 240, substantially cup shaped. Finally, an axial extended appendix 250 is bent along a radially external direction. In practice, the retention ring increases the axial sliding resistance of the bearing with respect to the housing, thanks to the radial interference between housing and ring. The ring is steadily connected to the plastic housing by means of co-molding, since the liquid plastic can flow inside the two pluralities of vanes 230, 240. The appendix 250, having a radially external inclination, contributes to the increasing of the axial sliding resistance too.

In FIG. 2 it is also clearly shown that the wing 210 of the retention ring 200 acts as a spacer, which separates the outer ring 11 from the sealing device 21. The use of a spacer allows to pre-assemble the sealing device 21 on the bearing, before the housing 12 is co-molded on the outer ring 11. The spacer, in other words the wing 210, which is interposed between the outer ring 11 and the sealing device 21, acts as a barrier against the plastic flow during co-molding and allows a proper closing of the mold, avoiding the direct contact between the sealing device 21 and the outer ring 11. The absence of such a spacer, for example as in the embodiment of FIG. 1, does not allow the co-molding of the sealing device on the bearing and, consequently, does not allow to realize the embodiment of FIG. 1 by means of only one operation.

Figure 4:
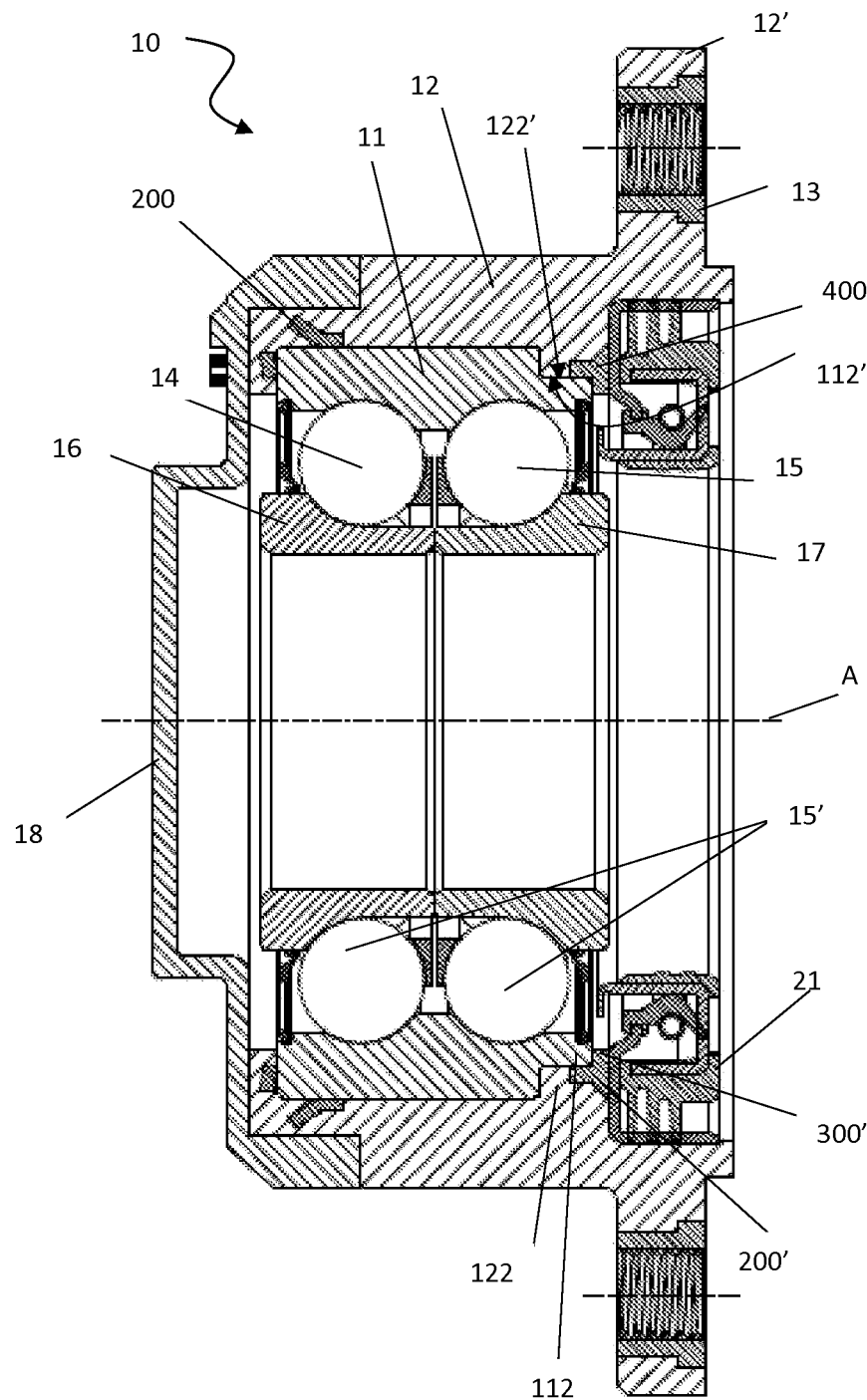
FIG. 4 is a section of the hub-bearing assembly, according to a third embodiment of the present invention.

A third embodiment of the invention is shown in FIG. 4. Such an embodiment comprises a first axial retention means consisting in a retention ring 200, as defined in FIG. 3, and located on the closing cap 18 side. On the flange 12' side, there is a second axial retention means consisting in the coupling of the portion 112, i.e. the empty portion of the outer ring 11, with the portion 122, i.e. the toothed portion of the plastic housing 12, in other words, the same solution of FIG. 1. Finally, a spacer is used in the form of a ring 400, having a portion 200', which is similar to the axially extended wing 220 of the ring 200, as previously described, and an appendix 300', which is similar to the radially extended wing 210 of the ring 200. Said appendix 300' extends in a radially internal direction and is shaped as a spacer: in fact, the appendix 300' is dimensionally and functionally equivalent to the spacer, which has been described with reference to FIG. 2.

Figure 5:
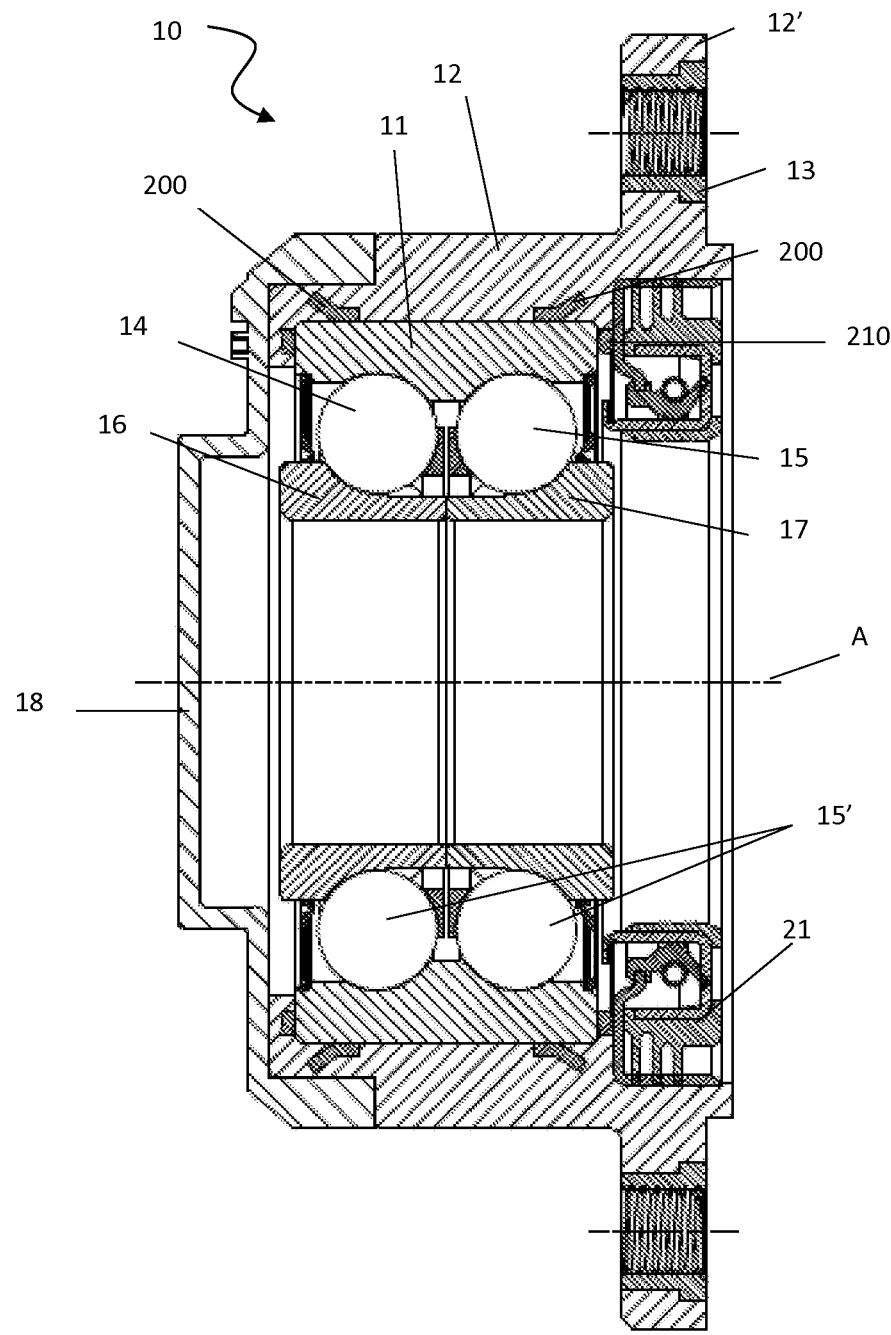
FIG. 5 is a section of the hub-bearing assembly, according to a fourth embodiment of the present invention.

Finally, a further possible embodiment of the invention is shown in FIG. 5: both on the closing cap side and on the flange side axial retention means are a retention ring 200, as described in FIG. 3.

In the double ring embodiment, the retention rings can present a substantially radially extended wing 210, working as a spacer, which acts as a barrier against the plastic flow during co-molding and allows a proper closing of the mold, avoiding the direct contact between the sealing device 21 and the outer ring 11.

In conclusion, the proposed invention allows to realize the housing co-molding on the bearing, for all possible applications and to increase the axial sliding resistance of the housing with respect to the bearing or vice versa. The use of a co-molded solution allows to obtain better sealing performances, a greater corrosion resistance, since the metal components directly exposed to the external environment are reduced, an easy assembling and a remarkable weight reduction.

Other than the embodiments of the invention, as above disclosed, it is to be understood that a vast number of variations exist. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A hub-bearing assembly comprising:
a rolling bearing including an outer ring, at least one inner ring, at least one row of rolling bodies and a sealing device;
a housing having an annular cylindrical shape, the housing at one end forming a radial flange, containing the rolling bearing and being in direct contact with the bearing outer ring;
a closing cap, assembled on the housing at the opposite end with respect to the one end, where the housing forms the flange, the cap being cup shaped; and
an axial retention feature, which is located along an external surface of the outer ring, said axial retention feature being opposed to an axial sliding direction of the outer ring with respect to the housing, wherein said axial retention feature comprises a retention ring, which is assembled with radial interference on the bearing outer ring, the retention ring presenting a section, substantially "L" shaped, having a substantially radially extended wing, which provides the ring with mechanical resistance,
wherein the housing is made of plastic material and is co-molded on the outer ring of the rolling bearing, and
wherein the substantially radially extended wing separates the outer ring from the sealing device.

2. The hub-bearing assembly according to claim 1, the axial retention feature further comprising at least one housing portion, wherein the at least one housing portion is shaped as a tooth and extends along a radially internal direction, and at least a corresponding outer ring portion, which is emptied along the same radially internal direction and makes available a volume, which is filled by said at least one housing portion.

3. The hub-bearing assembly according to claim 1, the retention ring further comprising a substantially axially extended wing and a plurality of vanes.

4. The hub-bearing assembly according to claim 1, the retention ring further comprising an axially extended appendix, which is bent along an external radial direction.

* * * * *